United States Patent [19]

Stout

[11] Patent Number: 4,948,494

[45] Date of Patent: Aug. 14, 1990

[54] REMOVAL OF HYDROGEN SULFIDE FROM PRODUCED FLUIDS

[75] Inventor: Charles A. Stout, Tustin, Calif.

[73] Assignee: Union Oil Company of California, Los Angeles, Calif.

[21] Appl. No.: 372,687

[22] Filed: Jun. 28, 1989

[51] Int. Cl.$^5$ ............................................. C10G 21/10
[52] U.S. Cl. .................................... 208/293; 208/189; 208/242; 208/222; 208/227; 210/708; 210/718; 166/262; 166/265; 166/266; 423/574 R; 423/574 L
[58] Field of Search ............... 208/242, 189, 293, 222, 208/227; 166/267, 265, 266; 423/574 R, 574 L; 210/708, 718

[56] References Cited

U.S. PATENT DOCUMENTS

| | | | |
|---|---|---|---|
| 2,953,523 | 9/1960 | Lehrian | 208/242 |
| 4,171,349 | 10/1979 | Cucuiat et al. | 208/242 |

FOREIGN PATENT DOCUMENTS

| | | | |
|---|---|---|---|
| 156814 | 9/1952 | Australia | 208/242 |
| 89403 | 7/1975 | Japan | 208/242 |
| 57205 | 5/1978 | Japan | 208/242 |
| 680655 | 10/1952 | United Kingdom | 208/242 |

*Primary Examiner*—Helane Myers
*Attorney, Agent, or Firm*—Gregory F. Wirzbicki; Michael A. Kondzella

[57] ABSTRACT

Hydrogen sulfide is removed from a water-in-oil emulsion by treatment of the emulsion with sulfur dioxide to convert the hydrogen sulfide to elemental sulfur. The elemental sulfur formed is distributed between the oil phase and the aqueous phase of the emulsion.

71 Claims, No Drawings

REMOVAL OF HYDROGEN SULFIDE FROM PRODUCED FLUIDS

FIELD OF THE INVENTION

This invention relates to petroleum technology. In one of its more particular aspects it relates to the removal of hydrogen sulfide from fluids produced from oil wells.

BACKGROUND OF THE INVENTION

Hydrogen sulfide is a frequent contaminant of petroleum-containing fluids, for example, fluids produced from oil wells. Such produced fluids typically contain a mixture of oil, brine and gas, in which hydrogen sulfide is present both in gaseous and dissolved forms. Not only is hydrogen sulfide toxic and does it have an unpleasant odor, but aqueous solutions of hydrogen sulfide are extremely corrosive. Even when hydrogen sulfide gas is separated from produced fluids, enough hydrogen sulfide remains dissolved to cause corrosion in process lines and vessels, such as pipelines from off-shore platforms to shore treating facilities. In some instances, corrosion may be sufficiently severe to result in sulfide stress cracking of steel pipes used to transport hydrogen sulfide-containing fluids.

Although various methods for removing hydrogen sulfide from gases and liquids during petroleum processing have been explored, the removal of hydrogen sulfide from the complex mixtures of oil, brine and gas present in fluids obtained from oil wells has proved to be a troublesome problem. Where it has been possible to achieve some degree of success in such removal, the processes used, such as treatment with acrolein, have generally involved great expense. In many instances by-products, which further contaminate the produced fluids, have had to be removed. It would be desirable to provide an economical method for the selective removal of hydrogen sulfide from oil well produced fluids which does not result in the creation of contaminating by-products.

SUMMARY OF THE INVENTION

The present invention provides a process for the removal of hydrogen sulfide from emulsified oil and brine mixtures, such as those present in fluids produced from oil wells. The process comprises treating a water-in-oil emulsion with sulfur dioxide to convert the hydrogen sulfide present in the emulsion to a mixture of elemental sulfur and polythionic acids. The process requires no catalyst and can be carried out at ambient conditions of temperature and pressure. It is capable of almost quantitative conversion of the hydrogen sulfide present in the emulsion. The sulfur produced in the process is distributed between the two phases of the emulsion. Part of the sulfur dissolves in the oil phase. Part is suspended in the water or aqueous phase. The part dissolved in the oil phase can remain therein without presenting any problem to the further processing of the oil phase. The part suspended in the aqueous phase can be readily recovered by water clarification techniques. The polythionic acids are present in the aqueous phase and cause no difficulty in further processing of the oil phase.

DESCRIPTION OF THE PREFERRED EMBODIMENTS

The present invention provides a method for the removal of hydrogen sulfide from water-in-oil emulsions, such as those commonly encountered in fluids produced from oil wells. Such fluids typically contain a mixture of oil, brine and gas. The hydrogen sulfide present in such fluids is an undesirable contaminant and must be removed. Typically, gaseous hydrogen sulfide must be removed from the mixture of gases contained in such fluids before the gases can be used. In the present invention the contaminating hydrogen sulfide remaining dissolved in the liquid fraction of such produced fluids in which at least a part of the mixture of oil and brine is emulsified, is removed by treating the liquid fraction with sulfur dioxide. The products produced in the reaction comprise elemental sulfur and polythionic acids with the sulfur predominating. The reaction is similar to that utilized in the Claus process for catalytic oxidation of gaseous hydrogen sulfide to elemental sulfur. However, the reaction utilized in the present invention does not require the use of a catalyst. Furthermore, the sulfur is present in both the aqueous and oil phases of the water-in-oil emulsion which constitutes the reaction medium for the process of the present invention. The sulfur in the aqueous phase is dispersed therein and can be recovered by clarification. The sulfur dissolved in the oil phase does not interfere with the subsequent processing of the oil and need not be removed from the oil phase. The polythionic acids are present as a mixture and have the formula $$HO_3S-S_x-SO_3H$$

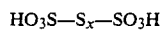

where X can be from 1 to 80. The polythionic acids, depending upon molecular weight, are dissolved or dispersed in the aqueous phase and can be removed therefrom along with the sulfur or disposed of after the sulfur is removed.

The present invention can be used to treat a variety of petroleum streams and is particularly useful for treating oil field fluids such as crude oil obtained from oil wells or off-shore oil installations. Such oil field fluids typically contain a mixture of oil, brine and gas. Hydrogen sulfide can be present in concentrations of about 1 ppm to about 5 percent in the gases present in such fluids. About 1 ppm to about 1 percent remains dissolved in the liquid following separation of gaseous hydrogen sulfide upon release of pressure.

In the process of the present invention, it is frequently desirable to treat the oil field fluids during transport thereof, for example, in undersea or on-shore pipelines. Treatment can also be conducted in production manifolds at any stage in the recovery of the oil from the oil field fluids. In fact, the process can be conducted at any point in the subsequent processing of the crude oil either before or after separation of gases from the crude oil. While the present invention is particularly designed for the treatment of oil field fluids, it should, nevertheless, be appreciated that the process is effective in the treatment of any water-in-oil emulsion which is contaminated with hydrogen sulfide.

The process of the present invention has the advantage of enabling an oil-in-water emulsion to be treated without demulsifying the emulsion, that is, without separating the aqueous and oil phases. Several of the previous methods for hydrogen sulfide removal required that the fluid being treated be separated into various phases prior to treatment.

The process of the present invention is carried out by introducing sulfur dioxide into the water-in-oil emulsion containing the contaminating hydrogen sulfide. For this purpose, gaseous sulfur dioxide or liquid sulfur dioxide can be used. It is preferred to use liquid sulfur dioxide because of the ease of handling sulfur dioxide in liquid form compared to handling gaseous sulfur dioxide. It is also possible to use, as a source of sulfur dioxide, a mixture of gases such as the exhaust gas from the SELECTOX process of Union Oil Company of California, Los Angeles, Calif., which contains carbon dioxide, nitrogen and, typically, about 0.5 percent sulfur dioxide. See U.S. Pat. Nos. 4,243,647, 4,444,742 and 4,171,347, which are hereby incorporated by reference in their entireties, for catalytic processes for removing hydrogen sulfide, with trace proportions of sulfur dioxide remaining in the exhaust gas.

In carrying out the process of the present invention, it is preferable that sulfur dioxide be introduced into the water-in-oil emulsion to be treated in excess of the stoichiometric amount. An excess in the range of about 200 percent to about 800 percent can be used. About 400 percent sulfur dioxide is preferred.

Although previously it had been considered that complete removal of hydrogen sulfide to form elemental sulfur and polythionic acids was precluded by equilibrium considerations, it unexpectedly has been found that the process of the present invention provides an almost quantitative conversion of hydrogen sulfide to elemental sulfur and polythionic acids. This is a decided advantage of the process of the present invention over the Claus process, which requires several catalytic stages to realize conversion efficiencies of about 90 percent or higher.

Typical conditions for the process of the present invention may include temperatures in the range of about 70° F. to about 700° F. and pressures in the range of about 1 atmosphere to about 1000 psi. Temperatures of about room temperature or above and pressures of about 150 psi to about 300 psi are preferred.

In the process of the present invention, reaction occurs in both the oil phase and in the emulsified brine droplets, but at different rates. The rates of mass transfer for sulfur dioxide and hydrogen sulfide across the brine-oil interface are important in accounting for the success of the process of the present invention. Sulfur dioxide is also converted to sulfite or bisulfite ions, as it dissolves in the brine droplets. This represents a waste of sulfur dioxide, as neither of these ionic species oxidizes hydrogen sulfide. The process of the present invention results in maximum hydrogen sulfide removal and minimum loss by conversion to sulfite and bisulfite.

As pointed out above, conversion of hydrogen sulfide present in water-in-oil emulsions to elemental sulfur in accordance with the process of the present invention is essentially quantitative. Although polythionic acids are produced as by-products in the process, they have no significant effect upon the further processing of the emulsion. As pointed out above, the elemental sulfur produced is distributed between the aqueous phase and the oil phase of the water-in-oil emulsion. The sulfur is preferentially soluble in the oil phase, but the rate of transfer from water droplets to oil is process dependent.

The present invention will be better understood by reference to the following examples which are included for purposes of illustration and are not to be construed as in any way limiting the scope of the present invention, which is defined in the appended claims.

EXAMPLE 1

Liquid sulfur dioxide was injected from a one-ton cylinder, using a variable speed pump having a capacity of 5940 lb. sulfur dioxide per day, into the liquid line leaving the gas-liquid separator of an off-shore oil drilling platform. The liquid line contained a fully emulsified brine-oil mixture. The sulfur dioxide injection rate was set at 2169 lb./day. From an initial value of 23 ppm, the dissolved sulfides in the emulsified brine rapidly dropped to zero.

The foregoing example illustrates the effective use of liquid sulfur dioxide in removing hydrogen sulfide from fully emulsified oil production fluids.

The following example illustrates the effect of injecting liquid sulfur dioxide into the brine stream separated from oil production fluids.

EXAMPLE 2

A one-ton cylinder of liquid sulfur dioxide was plumbed into the waste water system of an on-shore facility for processing off-shore oil production streams. An adjustable rate chemical pump with a maximum delivery of 444 ml./min. was used to introduce the liquid sulfur dioxide into the system. Liquid sulfur dioxide was injected into a line carrying combined brines from the unemulsified water separator and the heated demulsifier vessel. Sulfide content of the brine stream stabilized at 5 ppm with a throughput of 6700 bbl. water/day. Injection of liquid sulfur dioxide was commenced at a rate of 296 lb./day with no effect on the sulfide level. Sulfite was determined to be present. The liquid sulfur dioxide injection rate was increased over an eight hour period to a maximum rating of 4565 lb./day. No lowering of sulfide concentration was observed. Sulfite was determined to be present. Moving the injection point of the liquid sulfur dioxide to the incoming line from an off-shore oil drilling platform resulted in a sulfide concentration in the brine of 3 ppm which did not change at the maximum injection rate. Sulfite was determined to be present.

The foregoing two examples show the beneficial effect of adding liquid sulfur dioxide to the emulsified produced fluids compared to adding liquid sulfur dioxide to the brine, which has no effect.

The following example illustrates the effect of using gaseous sulfur dioxide in the process of the present invention.

EXAMPLE 3

Each of five 6 oz. prescription bottles was filled with a 120 ml. sample of produced fluids from the gas-liquid separator of an on-shore oil production facility.

Each of the samples was treated with gaseous sulfur dioxide at atmospheric pressure using a large hypodermic syringe fitted with a long, large bore needle. As quickly as possible, the cap of the bottle was removed, the needle inserted to the bottom of the bottle, and the opening tightly covered with a wad of cloth. The desired volume of sulfur dioxide was bubbled through the liquid in about 15 seconds, the needle and cloth removed, and the cap replaced. The bottles were shaken vigorously at frequent intervals for 30 minutes after the sulfur dioxide addition. They were treated with a demulsifier and placed in a 170° F. bath. Demulsification was rapid, giving clear, colorless brine. The free brine was tested for dissolved sulfide ion. The results are shown in Table 1.

TABLE 1

| Quantity of Sulfur Dioxide | Concentration of Sulfide, ppm |
|---|---|
| 0 (blank) | |
| 5 | 33 |
| 10 | 22 |
| 15 | 1 |
| 20 | 0 |

The foregoing example shows that gaseous sulfur dioxide is effective in removing hydrogen sulfide from emulsified produced fluids.

The invention may be embodied in other forms without departing from the spirit or essential characteristics thereof. For example, other water-in-oil emulsions and other reaction conditions may be utilized in practicing the present invention. Consequently, the present embodiments and examples are to be considered only as being illustrative and not restrictive, with the scope of the invention being defined by the appended claims. All embodiments which come within the scope and equivalency of the claims are therefore intended to be embraced therein.

I claim:

1. A process for the removal of hydrogen sulfide from a water-in-oil emulsion containing hydrogen sulfide which comprises treating said water-in-oil emulsion with sulfur dioxide to convert the hydrogen sulfide present in said emulsion to elemental sulfur.

2. A process according to claim 1 wherein said water-in-oil emulsion comprises petroleum.

3. A process according to claim 1 wherein said water-in-oil emulsion comprises crude oil.

4. A process according to claim 1 wherein said water-in-oil emulsion comprises a mixture of oil and brine.

5. A process according to claim 1 wherein said sulfur dioxide comprises liquid sulfur dioxide.

6. A process according to claim 2 wherein said sulfur dioxide comprises liquid sulfur dioxide.

7. A process according to claim 3 wherein said sulfur dioxide comprises liquid sulfur dioxide.

8. A process according to claim 4 wherein said sulfur dioxide comprises liquid sulfur dioxide.

9. A process according to claim 1 wherein said sulfur dioxide is present in excess of the stoichiometric amount.

10. A process according to claim 2 wherein said sulfur dioxide is present in excess of the stoichiometric amount.

11. A process according to claim 3 wherein said sulfur dioxide is present in excess of the stoichiometric amount.

12. A process according to claim 4 wherein said sulfur dioxide is present in excess of the stoichiometric amount.

13. A process according to claim 5 wherein said sulfur dioxide is present in excess of the stoichiometric amount.

14. A process according to claim 6 wherein said sulfur dioxide is present in excess of the stoichiometric amount.

15. A process according to claim 7 wherein said sulfur dioxide is present in excess of the stoichiometric amount.

16. A process according to claim 8 wherein said sulfur dioxide is present in excess of the stoichiometric amount.

17. A process according to claim 1 wherein said water-in-oil emulsion is treated with said sulfur dioxide in the absence of a catalyst.

18. A process according to claim 2 wherein said water-in-oil emulsion is treated with said sulfur dioxide in the absence of a catalyst.

19. A process according to claim 3 wherein said water-in-oil emulsion is treated with said sulfur dioxide in the absence of a catalyst.

20. A process according to claim 4 wherein said water-in-oil emulsion is treated with said sulfur dioxide in the absence of a catalyst.

21. A process according to claim 5 wherein said water-in-oil emulsion is treated with said sulfur dioxide in the absence of a catalyst.

22. A process according to claim 6 wherein said water-in-oil emulsion is treated with said sulfur dioxide in the absence of a catalyst.

23. A process according to claim 7 wherein said water-in-oil emulsion is treated with said sulfur dioxide in the absence of a catalyst.

24. A process according to claim 8 wherein said water-in-oil emulsion is treated with said sulfur dioxide in the absence of a catalyst.

25. A process according to claim 9 wherein said water-in-oil emulsion is treated with said sulfur dioxide in the absence of a catalyst.

26. A process according to claim 10 wherein said water-in-oil emulsion is treated with said sulfur dioxide in the absence of a catalyst.

27. A process according to claim 11 wherein said water-in-oil emulsion is treated with said sulfur dioxide in the absence of a catalyst.

28. A process according to claim 12 wherein said water-in-oil emulsion is treated with said sulfur dioxide in the absence of a catalyst.

29. A process according to claim 13 wherein said water-in-oil emulsion is treated with said sulfur dioxide in the absence of a catalyst.

30. A process according to claim 14 wherein said water-in-oil emulsion is treated with said sulfur dioxide in the absence of a catalyst.

31. A process according to claim 15 wherein said water-in-oil emulsion is treated with said sulfur dioxide in the absence of a catalyst.

32. A process according to claim 16 wherein said water-in-oil emulsion is treated with said sulfur dioxide in the absence of a catalyst.

33. A process according to claim 1 wherein said elemental sulfur is distributed between the aqueous phase and the oil phase of said water-in-oil emulsion.

34. A process according to claim 25 wherein said elemental sulfur is distributed between the aqueous phase and the oil phase of said water-in-oil emulsion.

35. A process according to claim 26 wherein said elemental sulfur is distributed between the aqueous phase and the oil phase of said water-in-oil emulsion.

36. A process according to claim 27 wherein said elemental sulfur is distributed between the aqueous phase and the oil phase of said water-in-oil emulsion.

37. A process according to claim 28 wherein said elemental sulfur is distributed between the aqueous phase and the oil phase of said water-in-oil emulsion.

38. A process according to claim 33 wherein a portion of said elemental sulfur is dissolved in said oil phase.

39. A process according to claim 34 wherein a portion of said elemental sulfur is dissolved in said oil phase.

40. A process according to claim 35 wherein a portion of said elemental sulfur is dissolved in said oil phase.

41. A process according to claim 36 wherein a portion of said elemental sulfur is dissolved in said oil phase.

42. A process according to claim 37 wherein a portion of said elemental sulfur is dissolved in said oil phase.

43. A process according to claim 33 wherein a portion of said elemental sulfur is suspended in said aqueous phase.

44. A process according to claim 34 wherein a portion of said elemental sulfur is suspended in said aqueous phase.

45. A process according to claim 35 wherein a portion of said elemental sulfur is suspended in said aqueous phase.

46. A process according to claim 36 wherein a portion of said elemental sulfur is suspended in said aqueous phase.

47. A process according to claim 37 wherein a portion of said elemental sulfur is suspended in said aqueous phase.

48. A process according to claim 38 wherein a portion of said elemental sulfur is suspended in said aqueous phase.

49. A process according to claim 39 wherein a portion of said elemental sulfur is suspended in said aqueous phase.

50. A process according to claim 40 wherein a portion of said elemental sulfur is suspended in said aqueous phase.

51. A process according to claim 41 wherein a portion of said elemental sulfur is suspended in said aqueous phase.

52. A process according to claim 42 wherein a portion of said elemental sulfur is suspended in said aqueous phase.

53. A process according to claim 1 wherein said hydrogen sulfide present in said emulsion is converted to a mixture of elemental sulfur and polythionic acids.

54. A process according to claim 2 wherein said hydrogen sulfide present in said emulsion is converted to a mixture of elemental sulfur and polythionic acids.

55. A process according to claim 3 wherein said hydrogen sulfide present in said emulsion is converted to a mixture of elemental sulfur and polythionic acids.

56. A process according to claim 4 wherein said hydrogen sulfide present in said emulsion is converted to a mixture of elemental sulfur and polythionic acids.

57. A process according to claim 48 wherein said hydrogen sulfide present in said emulsion is converted to a mixture of elemental sulfur and polythionic acids.

58. A process according to claim 49 wherein said hydrogen sulfide present in said emulsion is converted to a mixture of elemental sulfur and polythionic acids.

59. A process according to claim 50 wherein said hydrogen sulfide present in said emulsion is converted to a mixture of elemental sulfur and polythionic acids.

60. A process according to claim 51 wherein said hydrogen sulfide present in said emulsion is converted to a mixture of elemental sulfur and polythionic acids.

61. A process according to claim 52 wherein said hydrogen sulfide present in said emulsion is converted to a mixture of elemental sulfur and polythionic acids.

62. A process according to claim 53 wherein said polythionic acids are present in said aqueous phase.

63. A process according to claim 54 wherein said polythionic acids are present in said aqueous phase.

64. A process according to claim 55 wherein said polythionic acids are present in said aqueous phase.

65. A process according to claim 56 wherein said polythionic acids are present in said aqueous phase.

66. A process according to claim 57 wherein said polythionic acids are present in said aqueous phase.

67. A process according to claim 58 wherein said polythionic acids are present in said aqueous phase.

68. A process according to claim 59 wherein said polythionic acids are present in said aqueous phase 69. A process according to claim 60 wherein said polythionic acids are present in said aqueous phase.

70. A process according to claim 61 wherein said polythionic acids are present in said aqueous phase.

71. A process for the removal of hydrogen sulfide from a water-in-oil emulsion containing hydrogen sulfide which comprises contacting said water-in-oil emulsion with sulfur dioxide.

* * * * *